Figure 1:
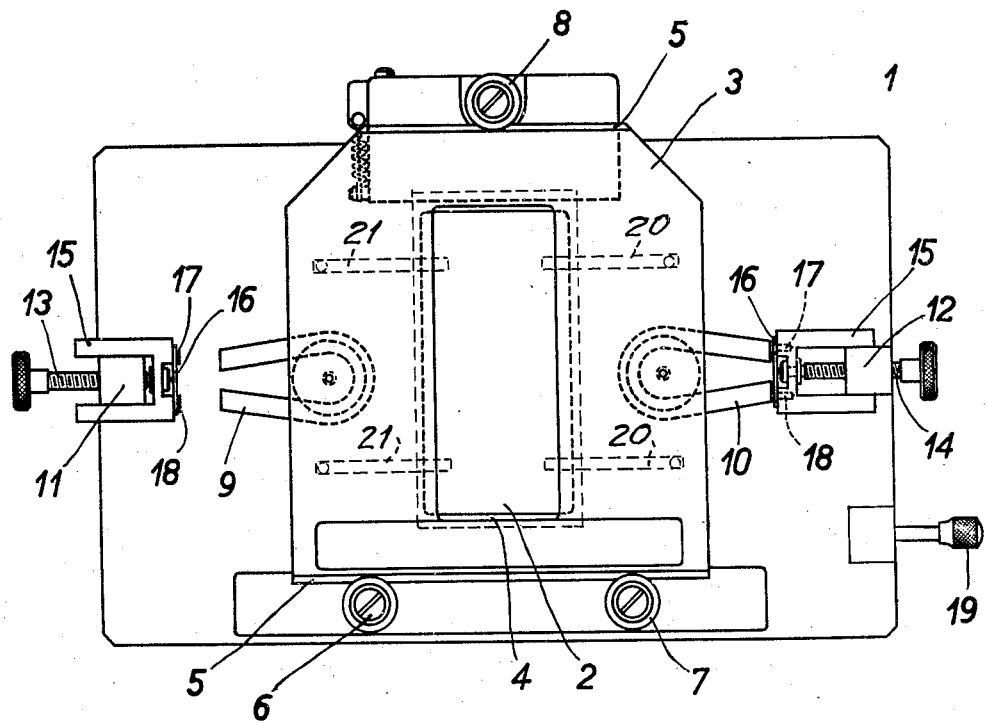

Feb. 8, 1944.  G. HANSEN  2,341,098

MICRO-PHOTOMETER

Filed Sept. 11, 1939

Inventor:

Gerhard Hansen

Patented Feb. 8, 1944

2,341,098

UNITED STATES PATENT OFFICE 2,341,098

MICROPHOTOMETER

Gerhard Hansen, Jena, Germany; vested in the Alien Property Custodian

Application September 11, 1939, Serial No. 294,277
In Germany September 15, 1938

3 Claims. (Cl. 88—14)

In the technical use of spectro-analyses it is becoming more and more important to attain as high a rapidity as possible in the measurement of photographic exposures. This proceeding consists nearly always in measuring the density of the blackening of spectral lines in each spectrum of a great quantity of spectra looking much alike which are photographed on one plate. The measurement concerns especially two lines which have the same distance apart in all spectra photographed on the same plate. The distance between the lines to be measured is different, however, with different substances. Accordingly an apparatus has been devised which permits the plate holder to be rapidly displaced over a distance that corresponds exactly to that between the two lines to be measured, especially because finding the lines generally takes up much time. The time required for measuring is considerably reduced as soon as the apparatus has once been adjusted to the distance apart of the lines in one spectrum. In this case the measurement of the two lines of each spectrum merely requires that the plate be displaced from spectrum to spectrum in the plane parallel to the plane of the photographic layer and at right angles to the extension of spectra, the plate holder being shifted by means of the apparatus to and fro between the two end positions. It is, therefore, of advantage in micro-photometers for rapidly measuring pairs of lines and especially pairs of spectral lines to provide adjustable stops for fixing end positions at will between which the plate holder can be displaced. Further, it is of importance that the plate holder can be reliably arrested in the two end positions. The image of a spectral line, which has in most cases only a breadth of less than 0.1 millimetre, is magnified 20 to 30 fold on the slit in front of the photoelectric cell. To avoid a readjustment in each end position, which would involve an additional loss of time, the plate holder is to assume always the same end positions and to be firmly arrested therein. For the sake of an easy displacement of this plate holder, it is necessary that no considerable power need be used for instance for operating mechanical arresting devices. It is furthermore of importance that the power tending to arrest the plate holder in the end positions rapidly increases with a decreasing of the distance between the plate holder and the respective end position. This rapid increasing of the attracting power is necessary especially in case the amount of displacement between the two end positions is very small, e. g., only 0.1 millimetre. Then the attracting power of the one of both arresting devices must positively overcome the counteracting power of attraction of the other arresting device. If for the purposes of the present invention mechanically working arresting devices are made use of, a construction of utmost precision of the cooperating elements would be necessary, and by this the apparatus would be considerably raised in price.

The invention accordingly provides that arresting of the plate holder in its two end positions adjustable by means of the stops is effected magnetically, conveniently by permanent magnets. To this effect, two stops are adjustably mounted each to one end of the plate holder and furnished with soft iron plates, while horseshoe magnets are fixed to the base plate, upon which the holder glides to and fro between the end positions. Further, it is convenient to use means that prevent the magnets and the said iron plates from touching each other, so that these parts cannot stick to each other and the plate holder can be withdrawn without much energy being required. Not only does the apparatus according to the invention thus fulfill in an ideal manner the demands set forth hereinbefore, but it is, moreover, exceedingly cheap.

Figure 2:
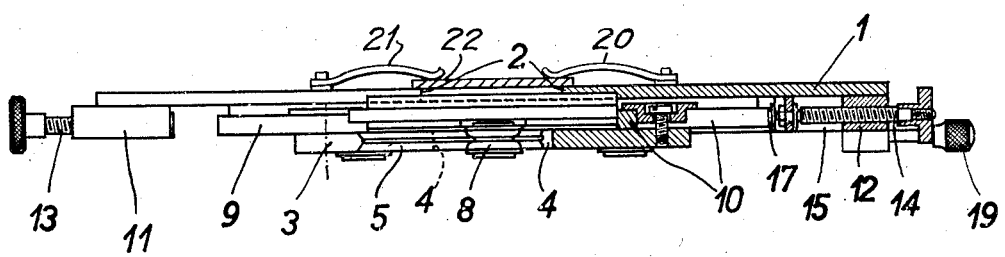

In the accompanying drawing, which illustrates the preferred embodiment of the invention, the apparatus is shown in Fig. 1 in a view from below, and in
Fig. 2 in part-sectional side elevation.

A plate holder 1 having a rectangular aperture 2 is displaceable on a stationary base 3 having an aperture 4. The base 3 has bevelled guide surfaces 5, between which the plate holder 1 can be made to slide by means of rollers 6, 7 and 8. To the base 3 are fixed horseshoe magnets 9 and 10. The plate holder 1 has stops which are constituted by a U-shaped iron part 15 and whose displacement relative to guide pieces 11 and 12 can be controlled very exactly through the agency of micrometer screws 13 and 14. To that end of the said iron part 15 which is nearest the magnet, a soft iron plate 16 is fixed by brass screws 17 and 18, which protrude approximately 0.5 millimetre above the plate 16 and prevent this plate from sticking to the magnet. A milled head 19, fastened to the plate holder 1, serves as a handle for moving the plate holder to and fro between the end positions so that the spectral lines can be accurately adjusted relatively to the slit of the photo-electric cell.

The means for displacing the plate from spectrum to spectrum in the plane parallel to the plane of the photographic layer and at right angles to the extension of spectra have been omitted in the drawing as being of no importance for the stopping means of the invention. Well known transporting mechanisms may conveniently be employed for this purpose. 20 and 21 are means for holding a photographic layer 22 on the plate holder 1.

I claim:

1. In a micro-photometer apparatus for measuring the density of the blackening of pairs of spectral lines on photographic layers, in combination a base plate provided with an aperture, a plate holder movably mounted on the base plate and provided with an aperture for receiving said photographic layer and registering with said aperture of said base plate, gliding means carried by the base plate for moving said plate holder to and fro between two end positions corresponding to the spacing of lines to be measured, adjustable means mounted on each end of said base plate and said plate holder, each of said means comprising two parts, one part carried by the plate holder and the other part carried by the base plate, said parts consisting of a magnet and an adjustable stop furnished with a soft iron plate, said stop capable of being attracted by said magnet upon approaching said plate holder to the corresponding end position and holding said plate holder in said position, the power of said magnets, however, not being sufficient to prevent movement of said plate holder from one end position to the other.

2. In a micro-photometer apparatus for measuring the density of the blackening of pairs of spectral lines on photographic layers, in combination a base plate provided with an aperture, a plate holder movably mounted on the base plate and provided with an aperture for receiving said photographic layer and registering with said aperture of said base plate, gliding means carried by the base plate for moving said plate holder to and fro between two end positions corresponding to the spacing of lines to be measured, two stops adjustably mounted each on one end of said plate holder and furnished with soft iron plates, and two horseshoe magnets mounted each on one end of said base plate, said iron plates capable of being attracted by said magnets upon approaching said plate holder to the corresponding end positions and holding said plate holder in said positions, the power of said magnets, however, not being sufficient to prevent movement of said plate holder from one end positiion to the other.

3. In a micro-photometer apparatus for measuring the density of the blackening of pairs of spectral lines on photographic layers, in combination a base plate provided with an aperture, a plate holder movably mounted on the base plate and provided with an aperture for receiving said photographic layer and registering with said aperture of said base plate, gliding means carried by the base plate for moving said plate holder to and fro between two end positions corresponding to the spacing of lines to be measured, adjustable means mounted on each end of said base plate and said plate holder, said means comprising two parts for each end, said parts consisting of a magnet and an adjustable stop furnished with a soft iron plate, one part carried by the base plate and the other part carried by the plate holder, said stop capable of being attracted by said magnet upon approaching said plate holder to the corresponding end position and holding said plate holder in said position, the power of said magnets, however, not being sufficient to prevent movement of said plate holder from one end position to the other, and means preventing contact between said magnets and said iron plates.

GERHARD HANSEN.